(12) United States Patent
Shimazawa et al.

(10) Patent No.: US 6,478,884 B2
(45) Date of Patent: *Nov. 12, 2002

(54) METHOD FOR MANUFACTURING THIN-FILM MAGNETIC HEAD WITH SPIN VALVE MAGNETORESISTIVE SENSOR

(75) Inventors: Koji Shimazawa, Nagano (JP); Manabu Ohta, Nagano (JP); Tetsuro Sasaki, Nagano (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/865,718

(22) Filed: May 29, 2001

(65) Prior Publication Data

US 2001/0045245 A1 Nov. 29, 2001

Related U.S. Application Data

(62) Division of application No. 09/215,538, filed on Dec. 18, 1998, now Pat. No. 6,302,970.

(30) Foreign Application Priority Data

Dec. 24, 1997 (JP) ................................. 9-365966

(51) Int. Cl.$^7$ ................................................. C21D 1/04
(52) U.S. Cl. ..................... 148/108; 148/121; 29/603.08
(58) Field of Search .................................. 148/108, 121; 29/603.08, 603.12, 603.14, 603.15

(56) References Cited

U.S. PATENT DOCUMENTS

| | | | | |
|---|---|---|---|---|
| 5,206,590 A | * | 4/1993 | Dieny et al. ................ | 324/252 |
| 5,422,571 A | * | 6/1995 | Gurney et al. .............. | 324/252 |
| 5,772,794 A | * | 6/1998 | Uno et al. ................... | 148/108 |
| 5,784,225 A | * | 7/1998 | Saito et al. ................. | 29/603.14 |
| 6,105,237 A | * | 8/2000 | Gill ............................. | 148/108 |

* cited by examiner

Primary Examiner—John Sheehan
(74) Attorney, Agent, or Firm—Arent Fox Kintner Plotkin Kahn

(57) ABSTRACT

A manufacturing method of a thin-film magnetic head with a spin valve effect MR read sensor includes a temperature-annealing step of firmly fixing the direction of the pinned magnetization in the spin valve effect MR sensor. The temperature-annealing step is executed by a plurality of times.

14 Claims, 7 Drawing Sheets

METHOD FOR MANUFACTURING THIN-FILM MAGNETIC HEAD WITH SPIN VALVE MAGNETORESISTIVE SENSOR

This is a Division of application Ser. No. 09/215,538 filed Dec. 18, 1998 now U.S. Pat. No. 6,302,970. The disclosure of the prior application is hereby incorporated by reference herein in its entirety.

FIELD OF THE INVENTION

The present invention relates to a manufacturing method of a thin-film magnetic head with a magnetoresistive (MR) sensor especially using spin valve effect, used for HDD (Hard Disk Drive) units.

DESCRIPTION OF THE RELATED ART

Recently, thin-film magnetic heads with MR read sensors based on spin valve effect of giant MR (GMR) characteristics are proposed (U.S. Pat. Nos. 5,206,590 and 5,422,571) in order to satisfy the requirement for ever increasing data storage densities in today's magnetic storage systems like hard disk drive units. The spin valve effect thin-film structure includes first and second thin-film layers of a ferromagnetic material separated by a thin-film layer of non-magnetic material, and an adjacent layer of anti-ferromagnetic material is formed in physical contact with the second ferromagnetic layer to provide exchange bias magnetic field by exchange coupling at the interface of the layers. The magnetization direction in the second ferromagnetic layer is constrained or maintained by the exchange coupling, hereinafter the second layer is called "pinned layer". On the other hand the magnetization direction of the first ferromagnetic layer is free to rotate in response to an externally applied magnetic field, hereinafter the first layer is called "free layers". The direction of the magnetization in the free layer changes between parallel and anti-parallel against the direction of the magnetization in the pinned layer, and hence the magneto-resistance greatly changes and giant magneto-resistance characteristics are obtained.

The output characteristic of the spin valve MR read sensor depends upon the angular difference of magnetization between the free and pinned ferromagnetic layers. The direction of the magnetization of the free layer is free to rotate in accordance with an external magnetic field. That of the pinned layer is fixed to a specific direction (called as "pinned directions") by the exchange coupling between this layer and adjacently formed anti-ferromagnetic layer.

In this kind of spin valve effect MR read sensor structure, the direction of the magnetization of the pinned layer may change in some cases by various reasons. If the direction of the magnetization changes, the angular difference between the pinned and free layers changes too and therefore the output characteristic also changes. Consequently stabilizing the direction of the magnetization in the pinned layer is very important.

In order to stabilize the direction of the magnetization by the strong exchange coupling between the pinned and anti-ferromagnetic layers, a process of temperature-annealing (pin anneal process) is implemented under an external magnetic field with a specific direction. The pin annealing is done as follows, first the temperature is elevated up to the Neel point under the magnetic field strength of 500 Oe to 3 k Oe, and held for about 30 minutes to 5 hours, and then cooled down to room temperature. By this pin anneal process, the exchange coupling is regulated at the interface of the pinned and anti-ferromagnetic layers toward the direction of the externally applied magnetic field.

However, the magnetoresistance characteristics may be changed under actual high temperature operation of a hard disk drive unit, even if the pin anneal processing is properly implemented. This degradation is caused by the high temperature stress during operation of the hard disk drive unit and by the magnetic field by a hard magnet layer used for giving a bias magnetic field to the free layer.

The detail of this degradation is as follows. The pinned direction of the magnetization in the pinned layer is different from that of the magnetic field ($H_{HM}$) by the hard magnet. And hence the direction of the magnetization of pinned layer which is contacted with the anti-ferromagnetic layer is slightly rotated toward the direction of $H_{HM}$ (hereinafter the direction of the magnetization of the pinned layer is expressed as $\theta_p$). In the anti-ferromagnetic material layer, the Neel point temperature differs from location to location inside the layer from macroscopic point of view, and it is distributed in a certain range of temperature. Even if the temperature is less than the "bulk" Neel point (average Neel point), there could be small area whose micro Neel point temperature is low and where the exchange coupling with the pinned layer disappears. When such spin valve effect MR read sensor is operated at a high temperature T, which is less than the blocking temperature at which the exchange couplings of all microscopic areas disappear, and then cooled down to usual room temperature, some microscopic area whose Neel temperatures are less than T is effectively annealed again and the direction of the magnetization is rotated to $\theta_p$. The total amount of the $\theta_p$ rotated area by the temperature cycle determines the magnetic structure of the anti-ferromagnetic layer and the new direction of the magnetization of the pinned layer.

As stated in the above paragraph, usage of such spin valve MR read sensor at high temperature may cause a change of the pinned direction of the magnetization in the pinned layer, and the electrical output characteristics of the sensor are degraded in signal levels, and waveform symmetry.

SUMMARY OF THE INVENTION

It is therefore an object of the present invention to resolve the aforementioned problems, and to provide a manufacturing method of a thin-film magnetic head apparatus, whereby pinned direction can be kept in stable at high temperature.

The present invention provides a manufacturing method of a thin-film magnetic head with a spin valve effect MR read sensor including a temperature-annealing step (pin anneal process) of firmly fixing the direction of the pinned magnetization in the spin valve effect MR sensor. The temperature-annealing step is executed by a plurality of times.

Going into detail, the present invention provides a method of manufacturing a thin-film magnetic head with a spin valve effect MR sensor, including a step of forming the spin valve effect MR sensor having first and second layers of a ferromagnetic material separated by a layer of non-magnetic material, and an adjacent layer of anti-ferromagnetic material formed in physical contact with the second ferromagnetic layer, and a step of temperature-annealing (pin anneal process) the spin valve effect MR sensor under a specific magnetic field with a defined direction to enhance the exchange coupling at the interface of the second ferromagnetic layer and the adjacent layer. The temperature-annealing steps are executed during wafer fabrication of the MR sensor by a plurality of times.

Twice or more executed pin anneal processes during wafer fabrication (from formation of spin valve effect thin-film structure on a wafer to just before dicing of the wafer into bars) give stronger exchange coupling and hence a spin valve effect MR sensor with more stable direction of the magnetization of the pinned layer under high temperature atmosphere i s realized. By stabilizing the direction of the magnetization of the pinned layer, the degradations of signal level and waveform symmetry of output waveforms under high temperature atmosphere c an be greatly reduced.

The temperature-annealing can be done in an independent dedicated process from the wafer fabrication, or in a part of another heat treatment process of the wafer fabrication, or in both of an independent specialized process from the wafer fabrication and a part of another heat treatment process of the wafer fabrication.

At the independent dedicated process for temperature-annealing under a magnetic field, the heat treatment temperature is elevated to a specified point (Neel temperature of the anti-ferromagnetic material of about 150 to 300° C.) and sustained for a specified duration time, and then it is cooled down to room temperature (about 20 to 30° C.).

An anisotropic magnetization applying process onto the first ferromagnetic layer is also preferred for the previously mentioned another heat treatment process. The anisotropic magnetization applying process may include a process for elevating the heat treatment temperature to a specific point and for sustaining it for a specified duration time under a specific magnetic field. The temperature-annealing step may be a step of cooling the heat treatment temperature down from the sustained point to room temperature (about 20 to 30° C.) under a magnetic field toward the pinned direction.

The another heat treatment process may be a resist curing process. The resist curing process may include a process for elevating the heat treatment temperature to a specific point and for sustaining it for a specified duration time under a specific magnetic field. The temperature-annealing step may be a step of cooling the heat treatment temperature down from the sustained point to room temperature (about 20 to 30° C.) under a magnetic field toward the pinned direction.

Further objects and advantages of the present invention will be apparent from the following description of the preferred embodiments of the invention as illustrated in the accompanying drawings.

DESCRIPTION OF THE PREFERRED EMBODIMENTS

Figure 1:
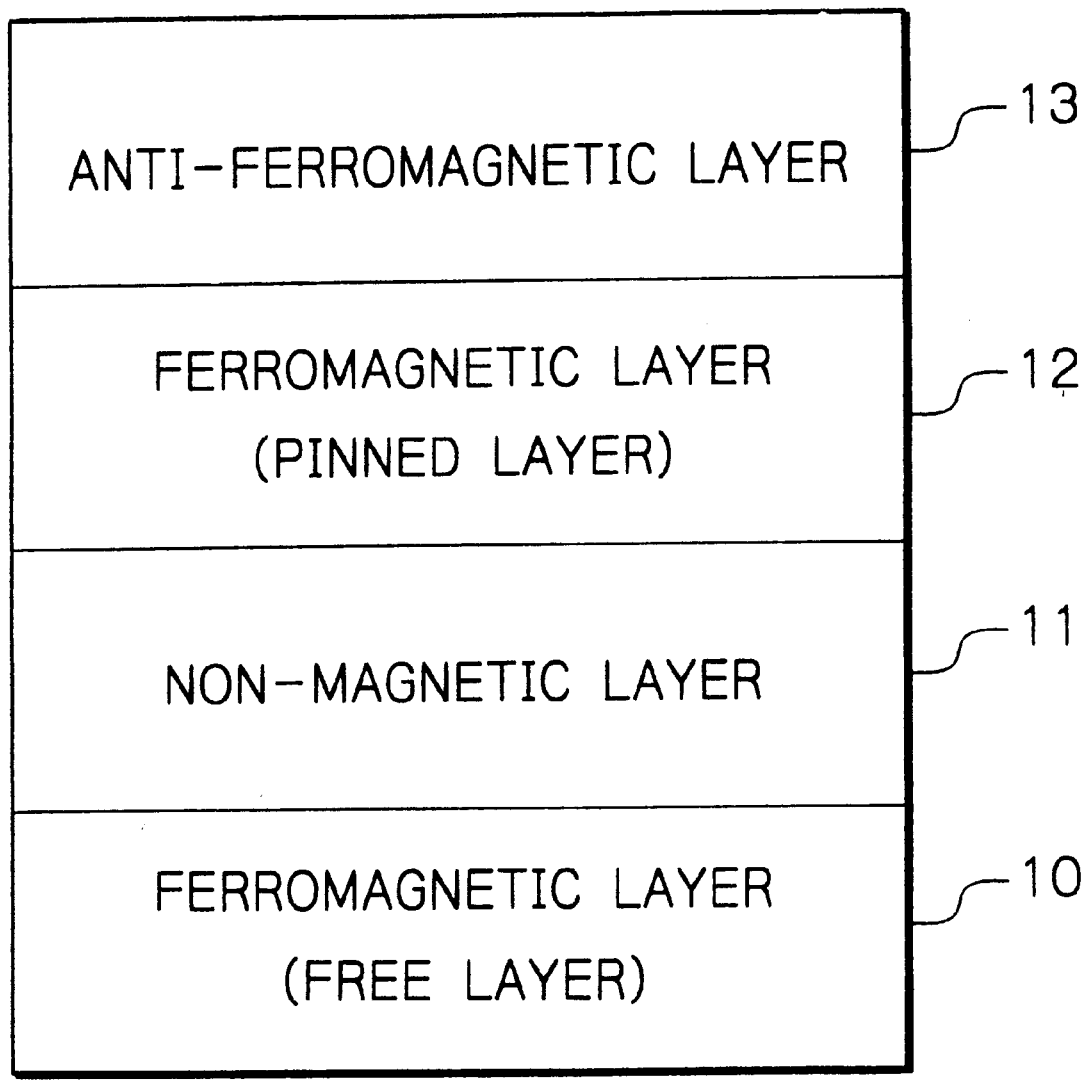
FIG. 1 shows a cross-sectional view of stacked thin-film layers of a spin valve effect MR read sensor.

FIG. 1 illustrates stacked thin-film layers of a spin valve effect MR read sensor. Referring to FIG. 1, reference number 10 and 12 are first and second ferromagnetic thin-film layers respectively which are separated by a thin-film layer 11 of a non-magnetic electrically conductive metallic material. On the second ferromagnetic thin-film layer 12, a thin-film layer 13 of anti-ferromagnetic material is stacked, and a magnetic field generated by the exchange coupling at the interface of the thin-film layers 12 and 13 magnetizes the ferromagnetic layer 12, and so to speak the layer is pinned. The first ferromagnetic thin-film layer 10 is a free layer in which there is no effect of exchange coupling and hence the magnetization is free to rotate in response to an externally applied magnetic field. An example of the spin valve effect MR read sensor structure by the embodiment of the present invention is as follows. The structure of free layer 10/non-magnetic metallic layer 11/pinned layer 12/anti-ferromagnetic layer 13 is of NiFe(90 Å)/Co(10 Å)/Cu(25 Å)/Co(20 Å)/RuRhMn(100 Å). The embodiment of the present invention is not limited to this structure.

The manufacturing process of this kind of spin valve effect MR read sensors are quite common in the industry except for the temperature-annealing process during the wafer fabrication. Therefore, only temperature-annealing process is described in detail hereinafter.

FIGS. 2a to 2f illustrate a set of various temperature-annealing profiles according to the present invention, and horizontal and vertical directions of the profiles are associated with time and temperature, respectively.

Figure 2A:
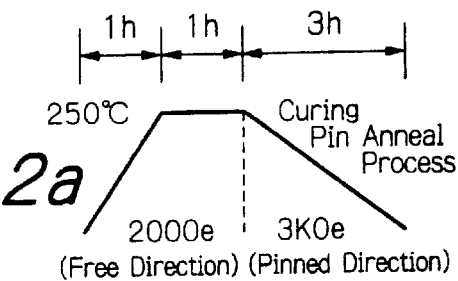
FIGS. 2a to 2f illustrate a set of various temperature-annealing profiles according to the present invention.
Figure 2A:
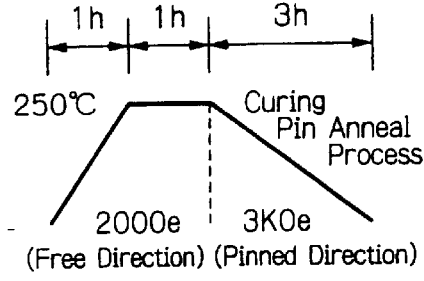

The embodiment shown in FIG. 2a relates to manufacturing process of a composite type thin-film magnetic head that consists of a spin valve effect MR read sensor or element and an inductive write element. Generally, at the wafer fabrication process of such composite type thin-film magnetic heads, firstly many spin valve effect MR read sensors are built on a wafer, secondly inductive write elements are formed on the MR sensors. In this embodiment of the present invention, the resist curing process for formation of first and second insulator layers of coils of the inductive write element is utilized as pin anneal process for magnetization of the pinned layer and repeated twice At the process of the formation of the first insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the specified direction of the magnetization of the free layer (called as "free direction"). After this heat treatment, another magnetic field of about 3 k Oe is applied toward the desired pin direction of the magnetization in the pinned layer (called as "pinned direction"), and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

Similarly at the process of the formation of the second insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the free direction. After this heat treatment, another magnetic field of about 3 k Oe is applied toward the pinned direction and the heat treatment temperature is gradually decreased down to room temperature during followed almost 3 hours. Using this method, totally two cycles of the pin annealing process at resist curing are implemented, and consequently more stable magnetization of the pinned layer is obtained against high temperature operation of such spin valve effect MR read sensor.

The stacked magnetic layer structure of a spin valve effect MR read sensor by the embodiment of the present invention showed only 7 degrees rotation of the magnetization of the pinned layer after the stress of 125° C. temperature near actual operation and enforcement of a magnetic field of 190 Oe toward the free direction for 100 hours. On the other hand the same stacked magnetic layer structure by only one cycle of pin annealing process showed 13 degrees rotation against the same stress condition. The method according to the present invention of two cycles of pin annealing process gives more stable magnetization of the pinned layer against high temperature operation of such spin valve effect MR read sensor.

Figure 5A:
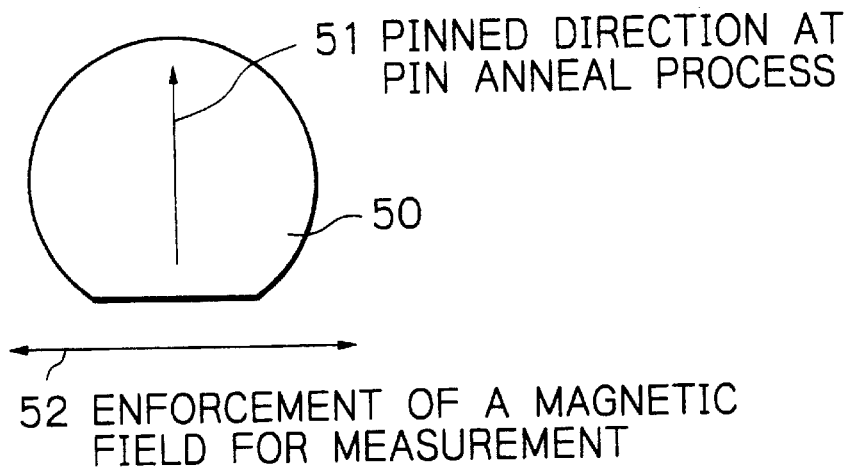
FIGS. 5a to 5c illustrate a method to measure the rotation angle of the direction of the magnetization of the pinned layer.
Figure 5B:
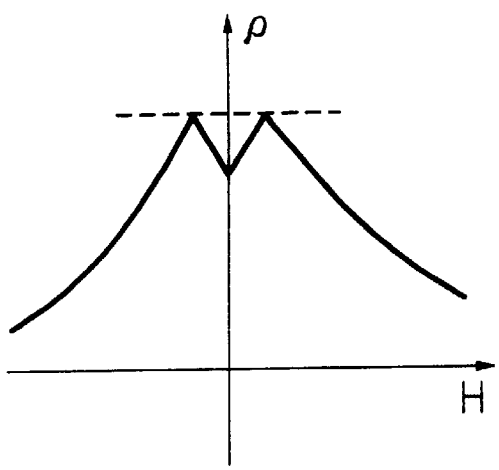
Figure 5C:
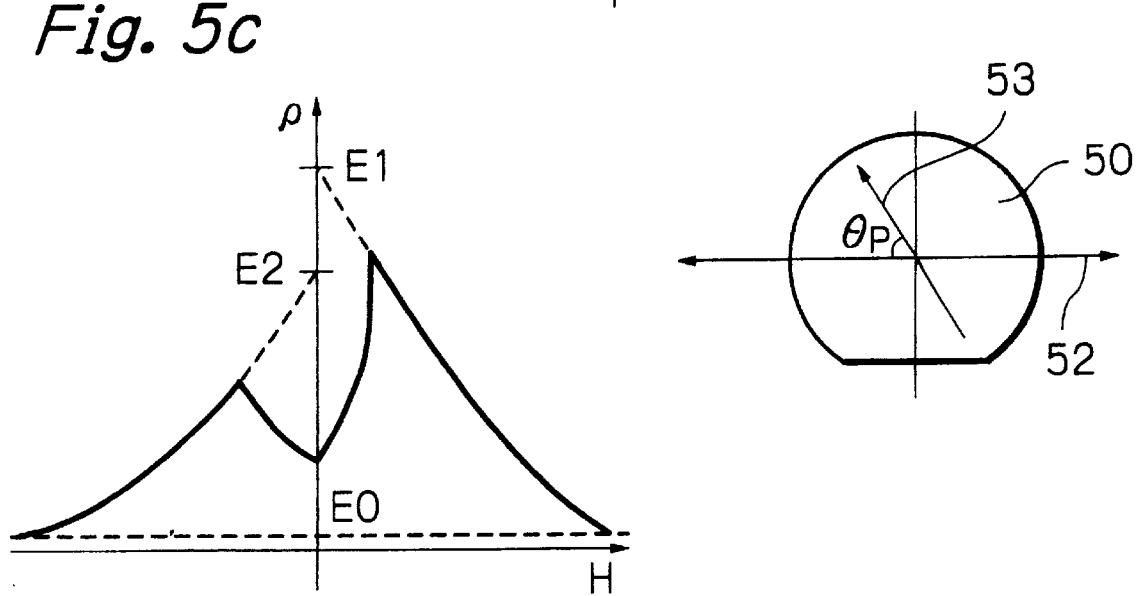

The rotation angle of the pinned direction can be easily calculated from the output level of the spin valve effect read sensor. Namely, as shown in FIG. 5a, first a magnetic field 52, which is perpendicular to the direction of the applied magnetic field 51 namely the pinned direction, is applied, then ρ-H loop is measured. If there is no rotation of the pinned direction, the measured ρ-H loop is horizontally symmetrical as shown in FIG. 5b. If there is definite rotation of the pinned direction, the measured ρ-H loop becomes horizontally unsymmetrical as shown in FIG. 5c. Assuming $\theta_p$ as the angle difference between the rotated pinned direction 53 and the applied measurement field direction 52, the following equation is formulated, $(E_1-E_0)/(E_2-E_0)=\{(1-\cos\theta_p)/2\}/\{(1+\cos\theta_p)/2\}$. Consequently $\theta_p$ is given by the next equation, $\theta_p=\cos^{-1}\{(E_1-E_0)/(E_2-E_1+2E_0)\}$. The rotation angle of the pinned direction is given by $90°-\theta_p$.

Figure 2B:
Figure 2B:
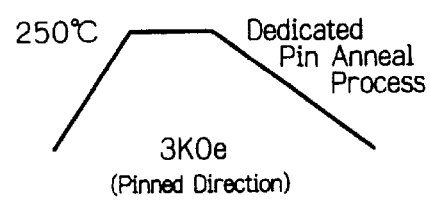

The embodiment shown in FIG. 2b also relates to manufacturing process of a composite type thin-film magnetic head that consists of a spin valve effect MR read sensor or element and an inductive write element. In this embodiment of the present invention, the resist curing process for formation of the insulator layer of coils of the inductive write element is utilized as the first anneal process for magnetization of pinned layer, and then an independent anneal process (called as "dedicated pin anneal process") is executed, totally two cycles of temperature-annealing are implemented.

At the process of the formation of the insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the specified direction of the magnetization of the free layer (called as "free direction"). After this heat treatment, another magnetic field of about 3 k Oe is applied toward the specified pinned direction of the magnetization in the pinned layer, and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

After this annealing process or after the completion of the total wafer fabrication, the heat treatment temperature is gradually elevated from room temperature to about 250° C. during about 1 hour under biasing a magnetic field of about 3 k Oe toward the direction of pinned magnetization, and the condition is sustained for almost 1 hour, then the heat treatment temperature is gradually decreased down to room temperature while almost 3 hours. Using this method, totally two pin anneal processes by one cycle of pin anneal process at the resist curing process for formation of the insulator layer of the inductive coils and by one cycle of the dedicated pin anneal process are implemented, and consequently more stable magnetization of the pinned layer is obtained against high temperature operation of such spin valve effect MR read sensor. The heat treatment temperature of the dedicated pin annealing process can be a temperature lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing. The effect of suppressing the rotation of the pinned direction in the embodiment of the present invention is similar with that in the embodiment FIG. 2a.

Figure 2C:
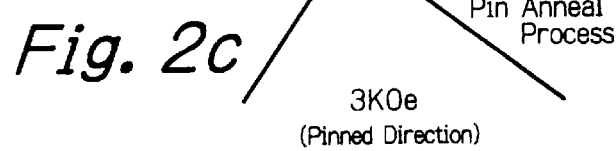

The embodiment shown in FIG. 2c relates to manufacturing process of a thin-film magnetic head that has a spin valve effect MR read sensor or element. In this embodiment of the present invention, two times of the dedicated pin anneal process are implemented.

At any process step after formation of the spin valve thin-film layer structure or after completion of the wafer fabrication, the heat treatment temperature is gradually elevated from room temperature to about 250° C. during about 1 hour under biasing a magnetic field of about 3 k Oe toward the direction of pinned magnetization, and the condition is sustained for almost 1 hour, then the heat treatment temperature is gradually decreased down to room temperature while almost 3 hours. This dedicated pin annealing process is repeated twice. This dedicated pin annealing process can be continuously repeated or the two annealing cycles can be separated by another fabrication process. Using this method, totally two cycles of the dedicated pin annealing process are implemented, and consequently more stable magnetization of the pinned layer is obtained against high temperature operation of such spin valve effect MR read sensor. The heat treatment temperature of the dedicated pin annealing process can be a temperature lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing.

The effect of suppressing the rotation of the pinned direction in the embodiment of the present invention is similar with that in the embodiment FIG. 2a.

Figure 2D:
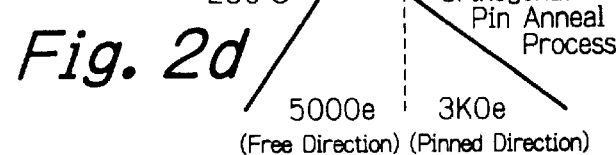
Figure 2D:
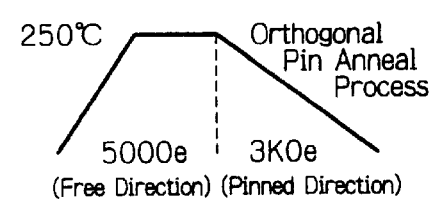

The embodiment shown in FIG. 2d relates to manufacturing process of a thin-film magnetic head that has a spin valve effect MR read sensor or element. In general, at the manufacturing of a thin-film magnetic head which has a spin valve effect MR read sensor, the free layer is magnetized during the wafer fabrication. In this embodiment of the present invention, two times of pin annealing process utilizing free layer magnetization (called the "orthogonal pin annealing process") are implemented.

After formation of the spin valve layer structure, the heat treatment temperature is gradually elevated from room temperature to about 250° C. for almost 1 hour and sustained for almost 1 hour, under enforcing a magnetic field of about 500

Oe toward the specified direction of the magnetization of the free layer (called as "free direction"). Then, another magnetic field of about 3 k Oe is applied toward the pinned direction of the magnetization in the pinned layer, and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

Similarly, the heat treatment temperature is gradually elevated from room temperature to about 250° C. for almost 1 hour and sustained for almost 1 hour, under enforcing a magnetic field of about 500 Oe toward the specified direction of the magnetization of the free layer (called as "free direction"). Then, another magnetic field of about 3 k Oe is applied toward the pinned direction of the magnetization in the pinned layer, and the heat treatment temperature is gradually decreased down to room temperature during followed almost 3 hours. Using this method, totally two cycles of the orthogonal pin annealing process are implemented, and consequently more stable magnetization of the pinned layer against high temperature operation of such spin valve effect MR read sensor is obtained.

The effect of suppressing the rotation of the pinned direction in the embodiment of the present invention is similar with that in the embodiment FIG. 2a.

Figure 2E:
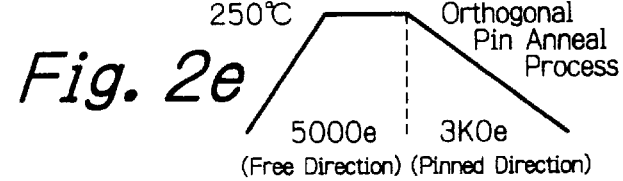
Figure 2E:
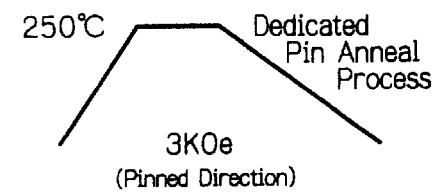

The embodiment shown in FIG. 2e relates to manufacturing process of a thin-film magnetic head that has a spin valve effect MR read sensor or element. In this embodiment, one cycle of the orthogonal pin annealing process and followed one cycle of the dedicated pin annealing process are executed. Totally, two cycles of pin annealing process are implemented.

After formation of the spin valve layer structure, the heat treatment temperature is gradually elevated from room temperature to about 250° C. for almost 1 hour and sustained for almost 1 hour, under enforcing a magnetic field of about 500 Oe toward the specified direction of the magnetization of the free layer (called as "free direction"). Then, another magnetic field of about 3 k Oe is applied toward the pinned direction of the magnetization in the pinned layer, and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

After this orthogonal pin annealing process or after completion of the wafer fabrication, the heat treatment temperature is gradually elevated from room temperature to about 250° C. during about 1 hour under biasing a magnetic field of about 3 k Oe toward the pinned direction, and the condition is sustained for almost 1 hour, then the heat treatment temperature is gradually decreased down to room temperature while almost 3 hours. Using this method, totally two steps by one cycle of the orthogonal pin annealing process and by one cycle of the dedicated pin annealing process are implemented, and consequently more stable magnetization of the pinned layer is obtained against high temperature operation of such spin valve effect MR read sensor. The heat treatment temperature of the dedicated pin annealing process can be a temperature lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing.

The effect of suppressing the rotation of the pinned direction in the embodiment of the present invention is similar with that in the embodiment FIG. 2a.

Figure 2F:
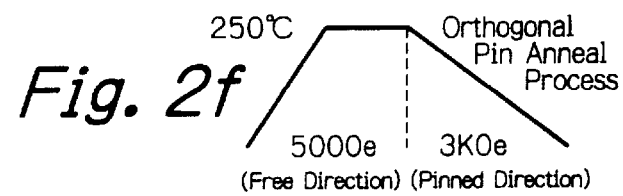
Figure 2F:
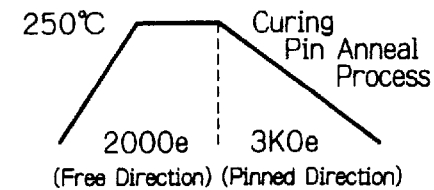

The embodiment shown in FIG. 2f relates to manufacturing process of a composite type thin-film magnetic head that consists of a spin valve effect MR read sensor or element and an inductive write element. In this embodiment, one cycle of the orthogonal pin annealing process and followed one cycle of the resist curing process for formation of the insulator layer of coils of the inductive write element as the annealing process are applied for magnetization of pinned layer. Totally, two cycles of pin annealing process are implemented.

After formation of the spin valve layer structure, the heat treatment temperature is gradually elevated from room temperature to about 250° C. for almost 1 hour and sustained for almost 1 hour, under enforcing a magnetic field of about 500 Oe toward the specified direction of the magnetization of the free layer (called as "free direction"). Then, another magnetic field of about 3 k Oe is applied toward the pinned direction of the magnetization in the pinned layer, and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

At the process of the formation of the insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the free direction. After this temperature treatment, another magnetic field of about 3 k Oe is applied toward the pinned direction and the heat treatment temperature is gradually decreased down to room temperature during followed almost 3 hours. Using this method, totally two pin annealing processes by one cycle of orthogonal pin annealing process and by one cycle of resist curing process applied for pin annealing are implemented, and consequently more stable magnetization of the pinned layer is obtained against high temperature operation of such spin valve effect MR read sensor.

The effect of suppressing the rotation of the pinned direction in the embodiment of the present invention is similar with that in the embodiment FIG. 2a.

FIGS. 3a to 3h illustrate another set of various temperature-annealing profiles according to the present invention, and horizontal and vertical directions of the profiles are associated with time and temperature respectively.

Figure 3A:
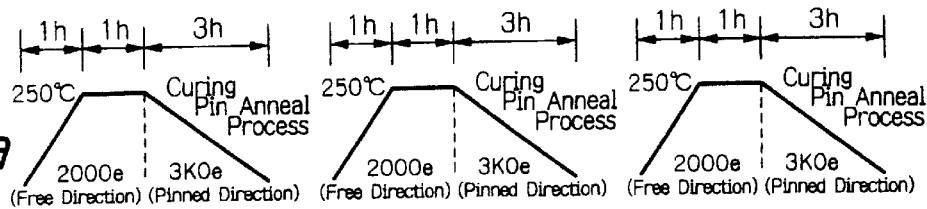
FIGS. 3a to 3h illustrate another set of various temperature-annealing profiles according to the present invention.

The embodiment shown in FIG. 3a relates to manufacturing process of a composite type thin-film magnetic head that consists of a spin valve effect MR read sensor or element and an inductive write element. Generally, during the wafer fabrication process of such composite type thin-film magnetic heads, firstly many spin valve effect MR read sensors are built on a wafer, secondly inductive write elements are formed on the MR sensors. In this embodiment of the present invention, the resist curing processes for formation of the first, second and third insulation layers of double layered coils of the inductive write element are applied as pin anneal processes for magnetization of pinned layer and repeated three times. Totally, three cycles of pin annealing process are implemented.

At the process of the formation of the first insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the specified direction of the magnetization of the free layer called as "free directions"). After this heat treatment, another magnetic field of about 3 k Oe is applied toward the pinned direction of the magnetization in the pinned layer, and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

Similarly, at the process of the formation of the second insulation layer, the curing of the resist is done by gradually elevating the heat treatment temperature from room temperature to about 250° C. for almost 1 hour and sustaining it for almost 1 hour. During this process a magnetic field of about 200 Oe is applied toward the free direction. After this heat treatment, another magnetic field of about 3 k Oe is applied toward the pinned direction of the magnetization, and the heat treatment temperature is gradually decreased down to room temperature during followed almost 3 hours. At the process of the formation of the third insulation layer of the coils, similar pin annealing process is done. Using this method, totally three cycles of the pin annealing process at resist curing are implemented, and consequently much more stable magnetization of the pinned layer is obtained against high temperature operation of such spin valve effect MR read sensor.

The stacked magnetic layer structure of a spin valve effect MR read sensor by the embodiment of the present invention showed only 3 degree rotation of the magnetization of the pinned layer after the stress of 125° C. temperature near actual operation and enforcement of a magnetic field of 190 Oe toward the free direction for 100 hours. On the other hand the same stacked magnetic layer structure by only one cycle of pin annealing showed 13-degree rotation against the same stress condition. The method of three cycles of pin annealing process gives much more stable magnetization of the pinned layer against high temperature operation of such spin valve effect MR read sensor.

Figure 3B:
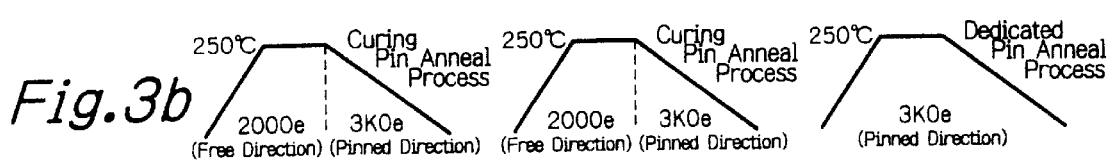

The embodiment shown in FIG. 3b also relates to manufacturing process of a composite type thin-film magnetic head that consists of a spin valve effect MR read sensor or element and an inductive write element. In this embodiment of the present invention, two cycles of the resist curing process for formation of the first and second insulator layers of coils of the inductive write element and one cycle of the dedicated pin annealing process are executed. Totally, three cycles of pin annealing process are implemented.

At the process of the formation of the first insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the specified direction of the magnetization of the free layer (called as "free direction"). After this heat treatment, another magnetic field of about 3 k Oe is applied toward the pinned direction of the magnetization, and the heat treatment temperature is gradually decreased down to room temperature during followed about 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

Similarly, at the process of the formation of the second insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the free direction. After this heat treatment, another magnetic field of about 3 k Oe is applied toward the pinned direction and the heat treatment temperature is gradually decreased down to room temperature during followed almost 3 hours. By this annealing processes stable magnetization of the pinned layer is obtained against high temperature operation of such spin valve effect MR read sensor.

After this annealing process or after the completion of the total wafer fabrication, the heat treatment temperature is gradually elevated from room temperature to about 250° C. during almost 1 hour under biasing a magnetic field of about 3 k Oe toward the direction of pinned magnetization, and the condition is sustained for almost 1 hour, then the heat treatment temperature is gradually decreased down to room temperature while almost 3 hours. Using this method, totally three pin annealing processes by the two cycles of resist curing process for formation of the insulator layers and one cycle of the dedicated pin annealing process are implemented, and consequently much more stable magnetization of the pinned layer is obtained against high temperature operation of such spin valve effect MR read sensor. The heat treatment temperature of the dedicated pin annealing process can be a temperature lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing.

The effect of suppressing the rotation of the pinned direction in the embodiment of the present invention is similar with that in the embodiment FIG. 3a.

Figure 3C:
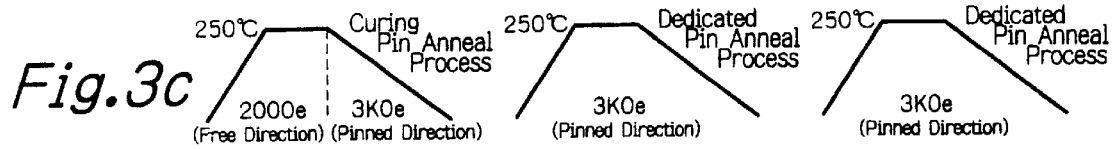

The embodiment shown in FIG. 3c also relates to manufacturing process of a composite type thin-film magnetic head that consists of a spin valve effect MR read sensor or element and an inductive write element. In this embodiment of the present invention, one cycle of the resist curing process for formation of an insulation layer of coils of the inductive write element and two cycles of the dedicated pin annealing process are executed. Totally three cycles of pin annealing process are implemented.

At the process of the formation of an insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the specified direction of the magnetization of the free layer (called as "free direction"). After this heat treatment, another magnetic field of about 3 k Oe is applied toward the pinned direction of the magnetization, and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

After this annealing process or after the completion of the total wafer fabrication, the heat treatment temperature is gradually elevated from room temperature to about 250° C. during about 1 hour under biasing a magnetic field of about 3 k Oe toward the direction of pinned magnetization, and the condition is sustained for almost 1 hour, then the heat treatment temperature is gradually decreased down to room temperature while about 3 hours. After this process or after the completion of the total wafer fabrication, one more similar dedicated pin annealing process is done. Using this method, totally three pin annealing processes by the one cycle of resist curing process for formation of an insulation layer and two cycles of the dedicated pin annealing process are implemented, and consequently much more stable magnetization of the pinned layer is obtained against high temperature operation of such spin valve effect MR read sensor. The heat treatment temperature of the dedicated pin annealing process can be a temperature lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing.

The effect of suppressing the rotation of the pinned direction in the embodiment of the present invention is similar with that in the embodiment FIG. 3a.

Figure 3D:
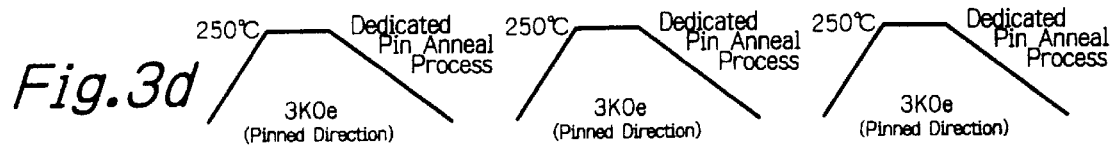

The embodiment shown in FIG. 3d relates to manufacturing process of a thin-film magnetic head that has a spin valve effect MR read sensor or element. In this embodiment of the present invention, three times of the dedicated pin annealing process are implemented. After formation of stacked magnetic layer structure of a spin valve effect MR read sensor or after the completion of the total wafer fabrication, the heat treatment temperature is gradually elevated from room temperature to about 250° C. during about 1 hour under biasing a magnetic field of about 3 k Oe toward the direction of pinned magnetization, and the condition is sustained for almost 1 hour, then the heat treatment temperature is gradually decreased down to room temperature while almost 3 hours. This pin annealing process is repeated three times. It can be continuously repeated, or each annealing process can be followed after another step of wafer fabrication. Using this method, totally three cycles of the dedicated pin annealing process are implemented, and consequently much more stable magnetization of the pinned layer is obtained against high temperature operation of such spin valve effect MR read sensor. The heat treatment temperature of the dedicated pin annealing process can be lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing.

The effect of suppressing the rotation of the pinned direction in the embodiment of the present invention is similar with that in the embodiment FIG. 3a.

Figure 3E:
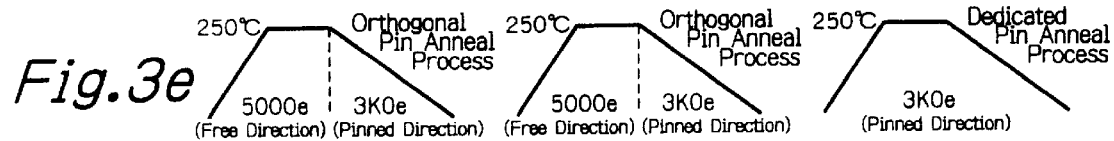

The embodiment shown in FIG. 3e relates to manufacturing process of a thin-film magnetic head that has a spin valve effect MR read sensor or element. In general, at the manufacturing of a thin-film magnetic head which has a spin valve effect MR read sensor, the free layer is magnetized during the wafer fabrication. In this embodiment of the present invention, two cycles of the orthogonal pin annealing process by free layer magnetization process and one cycle of the dedicated pin annealing process are executed. Totally, three cycles of pin annealing process are implemented.

After formation of the spin valve layer structure, the heat treatment temperature is gradually elevated from room temperature to about 250° C. for almost 1 hour and sustained for almost 1 hour, under enforcing a magnetic field of about 500 Oe toward the specified direction of the magnetization of the free layer (called as "free direction"). Then, another magnetic field of about 3 k Oe is applied toward the pinned direction and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

Similarly, the heat treatment temperature is gradually elevated from room temperature to about 250° C. for almost 1 hour and sustained for almost 1 hour, under enforcing a magnetic field of about 500 Oe toward the free direction. Then another magnetic field of about 3 k Oe is applied toward the pinned direction of the magnetization, and the heat treatment temperature is gradually decreased down to room temperature during followed almost 3 hours. Thus, totally two cycles of the orthogonal pin annealing process are implemented, and consequently more stable magnetization of the pinned layer against high temperature operation of such spin valve effect MR read sensor is obtained.

After this annealing process or after the completion of the total wafer fabrication, the heat treatment temperature is gradually elevated from room temperature to about 250° C. during about 1 hour under biasing a magnetic field of about 3 k Oe toward the direction of pinned magnetization, and the condition is sustained for almost 1 hour, then the heat treatment temperature is gradually decreased down to room temperature while almost 3 hours. Using this method, totally three pin annealing processes by the two cycles of the orthogonal pin annealing process and by one cycle of the dedicated pin annealing process are implemented, and consequently much more stable magnetization of the pinned layer is obtained against high temperature operation of such spin valve effect MR read sensor. The temperature of the dedicated pin annealing process can be a temperature lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing.

The effect of suppressing the rotation of the pinned direction in the embodiment of the present invention is similar with that in the embodiment FIG. 3a.

Figure 3F:
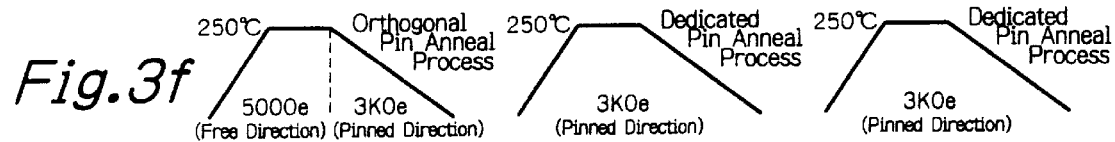

The embodiment shown in FIG. 3f relates to manufacturing process of a thin-film magnetic head that has a spin valve effect MR read sensor or element. In this embodiment, one cycle of the orthogonal pin annealing process and followed two cycles of the dedicated pin annealing process are applied. Totally, three cycles of pin annealing process are implemented.

After formation of the spin valve layer structure, the heat treatment temperature is gradually elevated from room temperature to about 250° C. for almost 1 hour and sustained for almost 1 hour, under enforcing a magnetic field of about 500 Oe toward the specified direction of the magnetization of the free layer (called as "free direction"). Then, another magnetic field of about 3 k Oe is applied toward the pinned direction of the magnetization, and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

After this orthogonal pin annealing process or after completion of the wafer fabrication, the heat treatment temperature is gradually elevated from room temperature to about 250° C. during about 1 hour under biasing a magnetic field of about 3 k Oe toward the direction of pinned magnetization, and the condition is sustained for almost 1 hour, then the heat treatment temperature is gradually decreased down to room temperature while almost 3 hours. Thus, totally three pin annealing processes by one cycle of the orthogonal pin annealing process and by two cycles of the dedicated pin annealing process are implemented, and consequently more stable magnetization of the pinned layer is obtained against high temperature operation of such spin valve effect MR read sensor. The heat treatment temperature of the dedicated pin annealing process can be a temperature lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing.

The effect of suppressing the rotation of the pinned direction in the embodiment of the present invention is similar with that in the embodiment FIG. 3a.

Figure 3G:
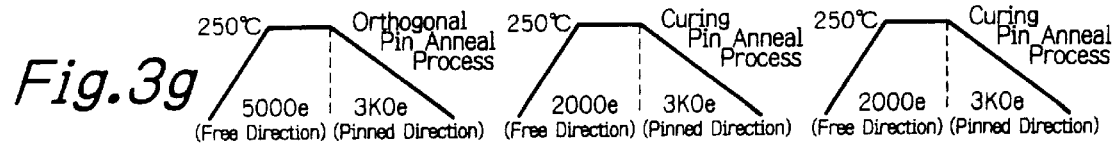

The embodiment shown in FIG. 3g relates to manufacturing process of a composite type thin-film magnetic head that consists of a spin valve effect MR read sensor or element and an inductive write element. In this embodiment, one cycle of the orthogonal pin annealing process and followed two cycles of the resist curing process for formation of the insulation layers of coils of the inductive write element as the annealing process are applied for magnetization of pinned layer. Totally, three cycles of pin annealing process are implemented.

After formation of the spin valve layer structure, the heat treatment temperature is gradually elevated from room temperature to about 250° C. for almost 1 hour and sustained for almost 1 hour, under enforcing a magnetic field of about 500 Oe toward the specified direction of the magnetization of the free layer (called as "free direction"). Then, another magnetic field of about 3 k Oe is applied toward the pinned direction of the magnetization, and the heat treatment temperature is gradually decreased down to room temperature during followed about 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

After that at the process of the formation of the first insulation layer of the inductive coils, the curing of the resist is done by gradually elevating the heat treatment temperature from room temperature to about 250° C. for almost 1 hour and sustaining it for almost 1 hour. During this process a magnetic field of about 200 Oe is applied toward the free direction. After this heat treatment, another magnetic field of about 3 k Oe is applied toward the pinned direction and the heat treatment temperature is gradually decreased down to room temperature during followed almost 3 hours. By this annealing processes stable magnetization of the pinned layer against high temperature operation of such spin valve effect MR read sensor is obtained.

Similarly, at the process of the formation of the second insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the free direction. After this heat treatment, another magnetic field of about 3 k Oe is applied toward the pinned direction and the heat treatment temperature is gradually decreased down to room temperature during followed almost 3 hours. Using this method, totally three pin annealing processes by one cycle of the orthogonal pin annealing process and by two cycles of resist curing process for formation of an insulation layer are implemented, and consequently much more stable magnetization of the pinned layer against high temperature operation of such spin valve effect MR read sensor is obtained.

The effect of suppressing the rotation of the pinned direction in the embodiment of the present invention is similar with that in the embodiment FIG. 3a.

Figure 3H:
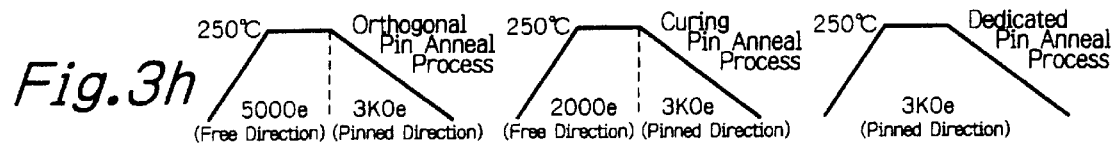

The embodiment shown in FIG. 3h relates to manufacturing process of a composite type thin-film magnetic head that consists of a spin valve effect MR read sensor or element and an inductive write element. In this embodiment, one cycle of the orthogonal pin annealing process, one cycle of the resist curing process for formation of the insulation layers of inductive coils of the inductive write element as the annealing process for magnetization of pinned layer and one cycle of the dedicated pin annealing process are executed. Totally, three cycles of pin annealing process are implemented.

After formation of the spin valve layer structure, the heat treatment temperature is gradually elevated from room temperature to about 250° C. for almost 1 hour and sustained for almost 1 hour, under enforcing a magnetic field of about 500 Oe toward the specified direction of the magnetization of the free layer (called as "free direction"). Then, another magnetic field of about 3 k Oe is applied toward the pinned direction of the magnetization, and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

Then, at the process of the formation of the insulation layer of the coils, the curing of the resist is done by gradually elevating the heat treatment temperature from room temperature to about 250° C. for almost 1 hour and sustaining it for almost 1 hour. During this process a magnetic field of 200 Oe is applied toward the free direction. After this heat treatment, another magnetic field of about 3 k Oe is applied toward the pinned direction and the heat treatment temperature is gradually decreased down to room temperature during followed almost 3 hours. By this annealing processes stable magnetization of the pinned layer is obtained against high temperature operation of such spin valve effect MR read sensor.

After the resist curing process for formation of an insulation layer or after completion of the wafer fabrication, the heat treatment temperature is gradually elevated from room temperature to about 250° C. during about 1 hour under biasing a magnetic field of about 3 k Oe toward the direction of pinned magnetization, and the condition is sustained for almost 1 hour, then the heat treatment temperature is gradually decreased down to room temperature while almost 3 hours. Applying this method, totally three pin annealing processes by one cycle of the orthogonal pin annealing process, by one cycle of the resist curing process for formation of an insulation layer and by one cycle of the dedicated pin annealing process are implemented, and consequently more stable magnetization of the pinned layer against high temperature operation of such spin valve effect MR read sensor is obtained. The heat treatment temperature of the dedicated pin annealing process can be a temperature lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing.

Figure 6:
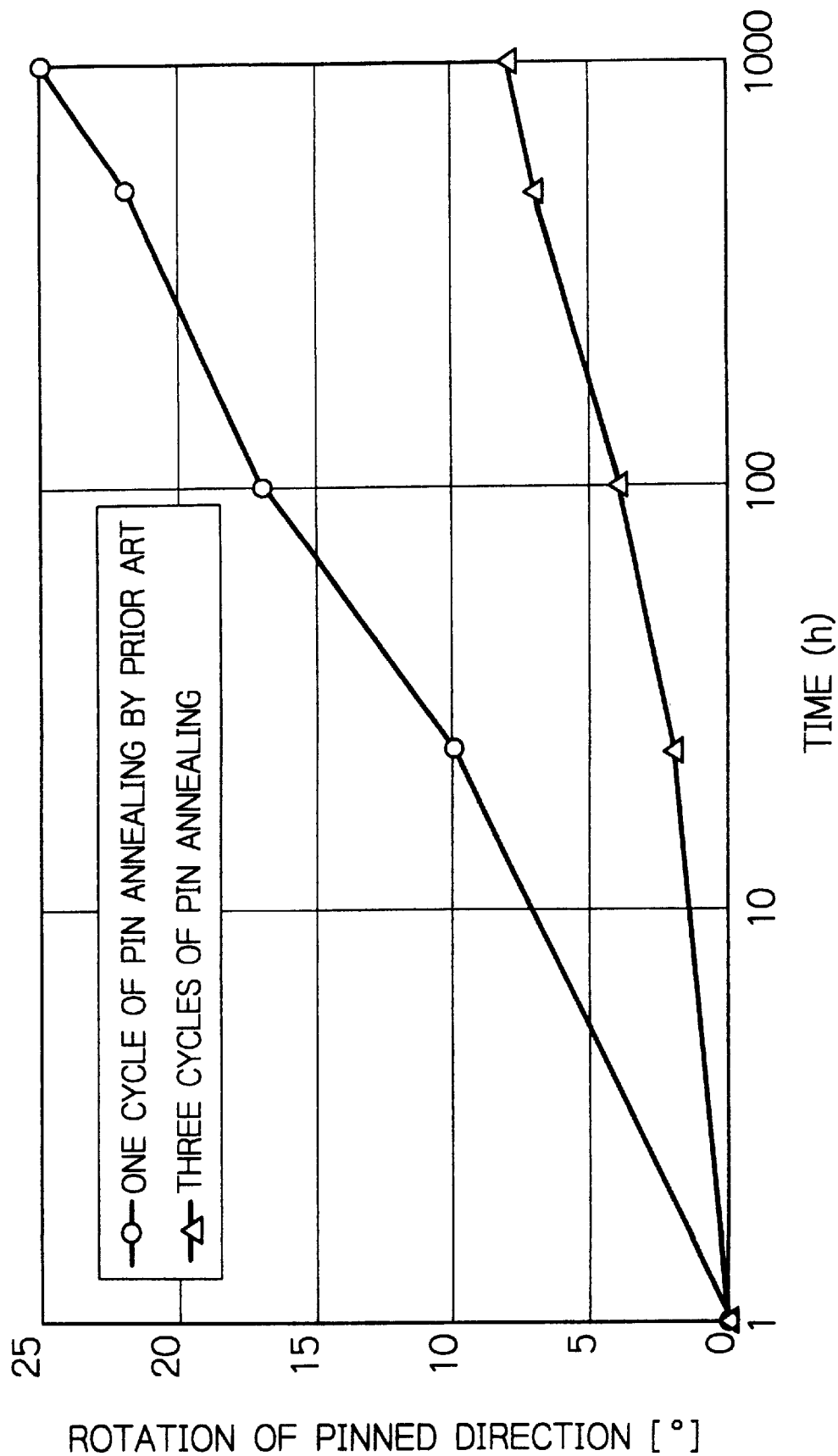
FIG. 6 is a graph illustrating the improved temperature characteristic of the magnetization rotation which is obtained by the annealing processes shown in FIG. 3.
Figure 7:
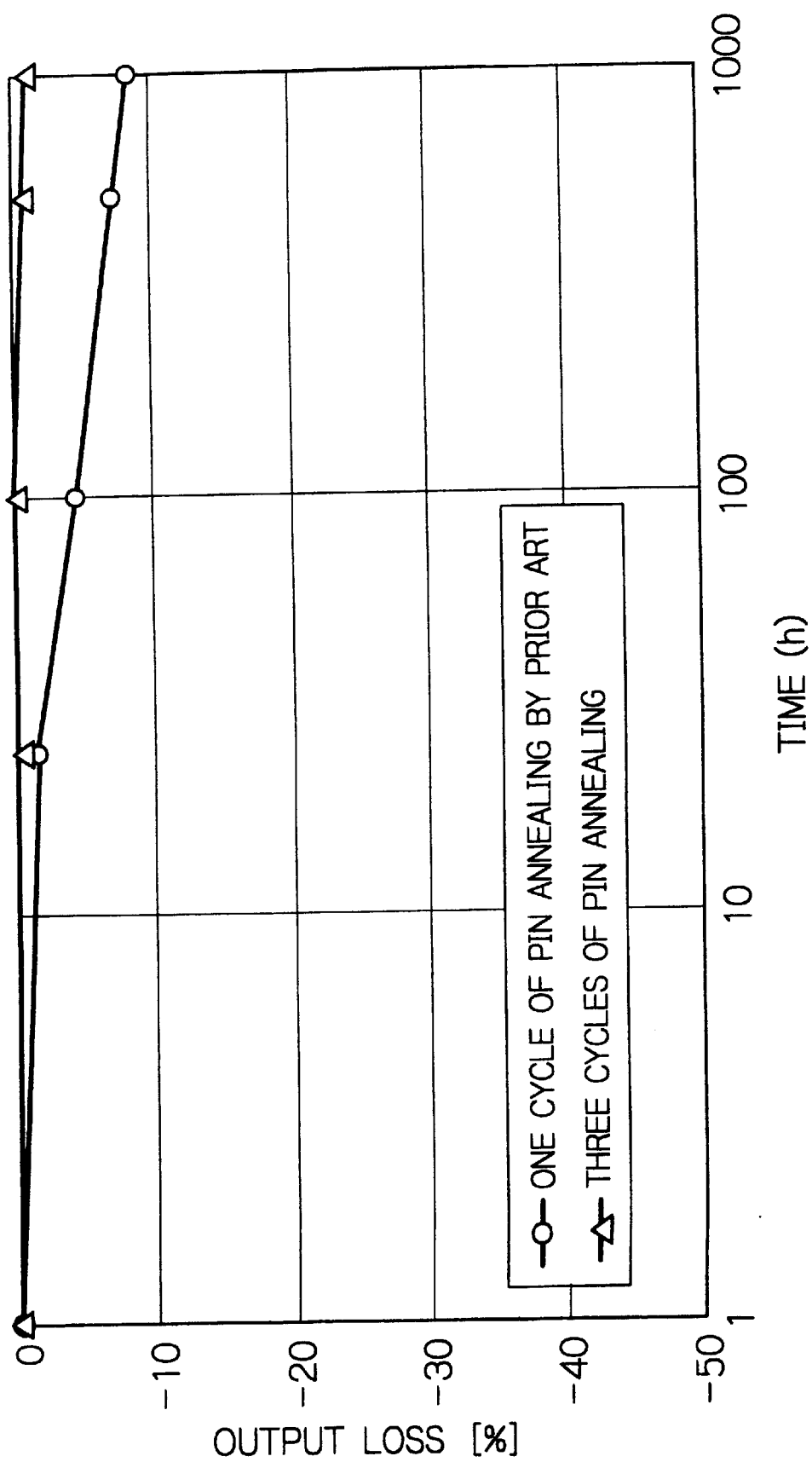
FIG. 7 is a graph illustrating the improved temperature characteristic of the output level degradation, which is obtained by the annealing processes shown in FIG. 3.

The effect of suppressing the rotation of the pinned direction in the embodiment of the present invention is similar with that in the embodiment FIG. 3a FIGS. 6 and 7 show the experimental results of thermal characteristics of spin valve effect MR read sensor built by implementation of three times of pin annealing process. The angular rotation of the direction of pinned magnetization (called as "pinned direction") of the widely stacked test purpose spin valve layer structure by only one cycle of pin annealing process and that by three cycles are compared in FIG. 6. The output degradation of the MR read sensor by only one cycle of pin annealing process and that by three cycles are compared in FIG. 7. In the experiment, the test sample's structure is by the free layer of NiFe(90 Å)/Co(10 Å), the nonmagnetic electrically conductive layer of Cu(25 Å), the pinned layer of Co(20 Å), the anti-ferromagnetic layer of RuRhMn(100 Å). Another structure by different materials also shows similar results. The stress test temperature was 125° C. The angular rotation of the direction of pinned magnetization of widely stacked test purpose spin valve layer structure was measured enforcing a magnetic field of 190 Oe toward the direction which is perpendicular to that of pinned magnetization after pin annealing processes. As shown in this embodiment of the present invention, executing three times of the pin annealing process very stable pinned magnetization under high temperature operation of 125° C. can be maintained. Not only stable pinned magnetization direction, but also small output degradation under high temperature operation of 125° C. are obtained.

Figure 4A:
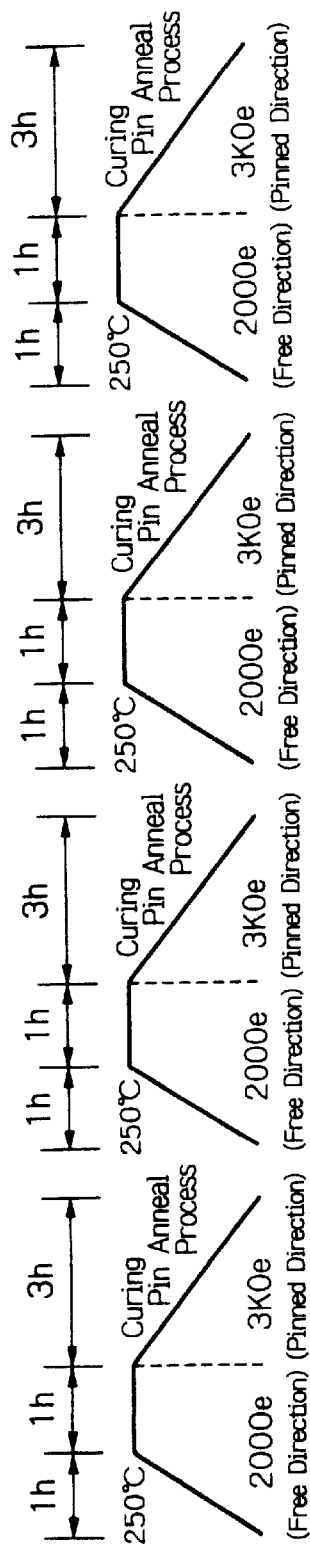
FIGS. 4a and 4b illustrate a further set of various temperature-annealing profiles according to the present invention.
Figure 4B:
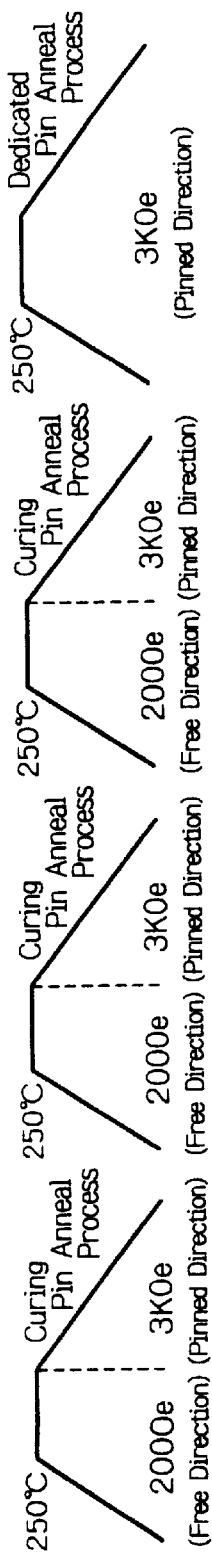

FIGS. 4a and 4b illustrate a further set of various temperature annealing profiles according to the present invention.

The embodiment shown in FIG. 4a relates to manufacturing process of a composite type thin-film magnetic head that consists of a spin valve effect MR read sensor or element and an inductive write element. Generally, during the wafer fabrication process of such composite type thin-film magnetic heads, firstly many spin valve effect MR read sensors are built on a wafer, secondly inductive write elements are formed on the MR sensors. In this embodiment of the present invention, the resist curing processes for formation of the first, second, third and fourth insulation layers of triple layered coils of the inductive write element are executed as pin anneal process for magnetization of pinned layer and repeated four times. Totally, four cycles of pin annealing process are implemented.

At the process of the formation of the first insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the specified direction of the magnetization of the free layer (called as "free direction"). After this heat treatment, another magnetic field of about 3 k Oe is applied toward the pinned direction and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

Similarly, at the process of the formation of the second insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the free direction. After this heat treatment, another magnetic field of about 3 k Oe is applied toward the pinned direction and the heat treatment temperature is gradually decreased down to room temperature during followed almost 3 hours. At the process of the formation of the third and fourth insulation layers of the coils, similar pin annealing process is done. Using this method, totally four cycles of the pin annealing process at resist curing are implemented, and consequently extremely stable magnetization of the pinned layer is obtained against high temperature operation of such spin valve effect MR read sensor.

The stacked magnetic layer structure of a spin valve effect MR read sensor by the embodiment of the present invention showed only 1 degree rotation of the magnetization of the pinned layer after the stress of 125° C. temperature near actual operation and enforcement of a magnetic field of 190 Oe toward the free direction for 100 hours. On the other hand the same stacked magnetic layer structure by only one cycle of pin annealing showed 13-degree rotation against the same stress condition. The method of three cycles of pin annealing process gives much more stable magnetization of the pinned layer against high temperature operation of such spin valve effect MR read sensor.

At the process of the formation of the first insulation layer of the coils, the curing of the resist is done by gradually elevating the heat treatment temperature from room temperature to 250° C. for almost 1 hour and sustaining it for almost 1 hour. During this process a magnetic field of about 200 Oe is applied toward the free direction. After this heat treatment, another magnetic field of about 3 k Oe is applied toward the pinned direction and the heat treatment temperature is gradually decreased down to room temperature during followed almost 3 hours. By this process of heating and cooling under the controlled temperature less than the blocking temperature of the anti-ferromagnetic material and the enforcement of the magnetic field toward pinning direction, exchange couplings between the pinned layer of ferromagnetic material and the deposited anti-ferromagnetic layer are generated.

Similarly, at the process of the formation of the second insulation layer of the coils, the curing of the resist is done by gradually elevating the heat treatment temperature from room temperature to about 250° C. for almost 1 hour and sustaining it for almost 1 hour. During this process a magnetic field of about 200 Oe is applied toward the free direction. After this heat treatment, another magnetic field of about 3 k Oe is applied toward the pinned direction and the heat treatment temperature is gradually decreased down to room temperature during followed almost 3 hours. The same annealing process is also implemented at the formation of the third insulation layer. By this annealing process, very stable magnetization of the pinned layer is obtained against high temperature operation of such spin valve effect MR read sensor.

After this annealing process or after the completion of the total wafer fabrication, the heat treatment temperature is gradually elevated from room temperature to about 250° C. during about 1 hour under biasing a magnetic field of about 3 k Oe toward the direction of pinned magnetization, and the condition is sustained for almost 1 hour, then the heat treatment temperature is gradually decreased down to room temperature while almost 3 hours. Using this method, totally four pin annealing processes by three cycles of resist curing process for formation of the insulator layers and by one cycle of the dedicated pin annealing process are implemented, and consequently extremely stable magnetization of the pinned layer is obtained against high temperature operation of such spin valve effect MR read sensor. The temperature of the dedicated pin annealing process can be a temperature lower than the blocking temperature of the anti-ferromagnetic material by 0 to 50° C. Under such lower temperature, enough effect of intensified exchange couplings is obtained. Lower temperature treatment gives lower risk of damages onto another part of the read sensor caused by high temperature annealing.

The effect of suppressing the rotation of the pinned direction in the embodiment of the present invention is similar with that in the embodiment FIG. 4a.

The previously described embodiments of the present invention show only some examples of process conditions of enforced magnetic field strength, temperature profiles and number of applied pin annealing processes in implementing resist curing pin annealing process, the dedicated pin annealing process and the orthogonal pin annealing process, and the process conditions depend upon the structure of thin-film head, the materials of the layers, the thickness of the layers and the requirements of thermal stability of pinned magnetization.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a thin-film magnetic head with a spin valve effect magnetoresistive sensor, comprising an annealing step of firmly fixing the direction of the pinned magnetization in said spin valve effect magnetoresistive sensor, said annealing step comprising a heat treatment process under a specified magnetic field being executed during wafer fabrication of said magnetoresistive sensor a plurality of times.

2. The method as claimed in claim 1, wherein said annealing step comprises a heat treatment process under said specified magnetic field and a curing pin annealing process.

3. The method as claimed in claim 2, wherein said heat treatment process comprises elevating a heat treatment temperature to a specified temperature and sustaining said heat treatment temperature for a specified duration time, and then reducing said heat treatment temperature to room temperature with enforcement of said specific magnetic field toward a pinned direction.

4. The method as claimed in claim 1, wherein said annealing step further comprises at least a first annealing step and a second annealing step, said first annealing step having a different purpose executed in the wafer fabrication from said second annealing step.

5. The method as claimed in claim 4, wherein said first annealing step is a process for applying anisotropic magnetization to said first ferromagnetic layer.

6. The method as claimed in claim 5, wherein said anisotropic magnetization applying process includes a process for elevating the heat treatment temperature to a specific point and for sustaining it for a specified duration time under a specific magnetic field.

7. The method as claimed in claim 4, wherein said first annealing step is a resist curing process.

8. The method as claimed in claim 7, wherein said resist curing process includes a process for elevating the heat treatment temperature to a specific point and for sustaining it for a specified duration time under a specific magnetic field, and wherein said first annealing step includes a step of cooling the heat treatment temperature down from the sustained point to room temperature under a magnetic field toward the pinned direction.

9. The method as claimed in claim 1, wherein said annealing step further comprises at least a first annealing step and a second annealing step, said first annealing step is done in a heat treatment process under said specified magnetic field which is dedicated to the annealing, and said second annealing step is done in a heat treatment process under said specified magnetic field for a different purpose than said first annealing step, each step being executed in the wafer fabrication.

10. The method as claimed in claim 9, wherein each of said annealing steps is implemented by elevating the heat treatment temperature to a specified point and sustaining it for a specified duration and then cooling down to room temperature with enforcement of a specific magnetic field toward a pinned direction.

11. The method as claimed in claim 9, wherein said second annealing step includes a process for applying anisotropic magnetization to said first ferromagnetic layer.

12. The method as claimed in claim 11, wherein said anisotropic magnetization applying process includes a process for elevating the heat treatment temperature to a specific point and for sustaining it for a specified duration time under a specific magnetic field, and wherein said second annealing step is a step of cooling the heat treatment temperature down from the sustained point to room temperature under a magnetic field toward the pinned direction.

13. The method as claimed in claim 9, wherein said second annealing step includes a resist curing process.

14. The method as claimed in claim 13, wherein said resist curing process includes a process for elevating the heat treatment temperature to a specific point and for sustaining it for a specified duration time under a specific magnetic field.

* * * * *